(12) United States Patent  
Belakovskiy et al.

(10) Patent No.: US 7,672,956 B2  
(45) Date of Patent: Mar. 2, 2010

(54) METHOD AND SYSTEM FOR PROVIDING A SEARCH INDEX FOR AN ELECTRONIC MESSAGING SYSTEM BASED ON MESSAGE THREADS

(75) Inventors: Igor L. Belakovskiy, Cambridge, MA (US); Niklas Heidloff, Satzkotten (DE); David A. Brooks, Providence, RI (US); Craig R. Wolpert, Holliston, MA (US); Hong Dai, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 11/118,969

(22) Filed: Apr. 29, 2005

(65) Prior Publication Data

US 2006/0248151 A1    Nov. 2, 2006

(51) Int. Cl.  
*G06F 17/30* (2006.01)

(52) U.S. Cl. .................. 707/100; 709/206; 715/752

(58) Field of Classification Search ............ 707/3, 707/4, 6, 100, 104.1, 200, 201, 203, E17.108, 707/E17.083; 709/203, 204, 206, 207; 715/752  
See application file for complete search history.

(56) References Cited

U.S. PATENT DOCUMENTS

| | | | |
|---|---|---|---|
| 5,771,355 A | 6/1998 | Kuzma | |
| 6,496,853 B1 * | 12/2002 | Klein | 709/206 |
| 6,625,620 B1 | 9/2003 | Tagg | |
| 6,631,398 B1 * | 10/2003 | Klein | 709/206 |
| 7,143,091 B2 * | 11/2006 | Charnock et al. | 707/5 |
| 2002/0016818 A1 | 2/2002 | Kirani et al. | |
| 2002/0059384 A1 | 5/2002 | Kaars | |
| 2002/0065892 A1 | 5/2002 | Malik | |
| 2003/0041112 A1 * | 2/2003 | Tada et al. | 709/206 |
| 2004/0051736 A1 * | 3/2004 | Daniell | 345/752 |
| 2004/0064473 A1 | 4/2004 | Thomas et al. | |

FOREIGN PATENT DOCUMENTS

JP          02004145569 A       4/2004

* cited by examiner

*Primary Examiner*—Greta L Robinson  
(74) *Attorney, Agent, or Firm*—David A. Dagg

(57) ABSTRACT

When a message having at least one attachment is obtained for indexing, it is indexed as N+1 separate documents, where N is the number of attached documents. If the message is part of a message thread, then information regarding the last message in the thread is retrieved, and search index attachment meta data for the last message is extracted. A unique identifier is computed for the newly obtained attachments, and used to search for matches in the attachments for the last message in the thread. If there is a match, then the newly obtained attachment is not indexed, but the unique identifier of the previously indexed matching attachment is added to a body index document for the new message. A unique identifier associated with the new message is also added to a list of parent identifiers associated with the attachment.

13 Claims, 5 Drawing Sheets

METHOD AND SYSTEM FOR PROVIDING A SEARCH INDEX FOR AN ELECTRONIC MESSAGING SYSTEM BASED ON MESSAGE THREADS

FIELD OF THE INVENTION

The present invention relates generally to electronic messaging systems, and more specifically to a method and system for providing a search index based on message threads.

BACKGROUND OF THE INVENTION

Electronic messaging systems, such as electronic mail ("email"), have become ubiquitous for both business and personal use. Examples of email applications include Microsoft® Outlook, Outlook Express, and Web based email systems provided through an Internet browser program, such as services provided through Google, Yahoo, and other Web portal providers. Email systems are often architected in a client-server software model, in which client software is provided in end user computer systems to enable users to compose, send and receive messages, while a server software component is provided to perform various centralized functions.

Typical email applications provide a user with a graphical user interface through which messages can be composed and sent, and through which messages can be received. A number of mailbox constructs are usually maintained for the user, including an Inbox to store received messages, an Outbox into which messages are put pending being sent, and a Sent mailbox for storing messages that have previously been transmitted. An email message usually includes or is associated with a list of destination addresses or user names identifying users to which the message is to be delivered, sometimes known as a "TO:" field. A "FROM:" field is also included or associated with a message, and identifies the send of the message. A "SUBJECT:" field for an email message includes a text string defining the subject of the message. A message body contains the content of the message, including text, images, links, or other content. A number of separate documents may also be attached to the message before it is sent, containing additional content to that contained within the message body. An "ATTACH" button object or the like is often provided in the graphical user interface. If the user uses the mouse to click on the "ATTACH" button, the user interface allows the user to indicate one or more documents to be attached to the message, such that they are conveyed with the message to the indicated recipients. Content stored in attached documents may be of any specific content type or format, including text, audio, video, or other application specific content. After the message body, destination email addresses, and any attachments to the message are defined, the user can click on a "SEND" button or the like to cause the message to be sent.

When a message is received, the email client software provides the ability for the receiving user to reply to the received message, for example by way of a "REPLY" and/or "REPLY ALL" button within the graphical user interface. Clicking on the "REPLY" button sets up a message, including the received message, for editing and sending back to the original sender of the received message. Clicking on the "REPLY ALL" button sets up a message, including the received message, for editing and sending back to the original sender and any other recipients of the original message. Often, the message sent back to the original sender includes both the original message body, as well as any attachments that were included with the original message. When a reply is sent that includes all previous message information, such as attachment documents, such a reply is sometimes referred to as a "reply with history". The original sender, or any other recipient of the reply message, may then similarly generate another reply. A series of reply messages, based on a single "root" message, each of which may add some amount of text or other content to the preceding message or reply, and typically each having a common associated "SUBJECT:" string, may be referred to for purposes of explanation herein as an email message "thread".

Existing email systems also provide the ability for a user to perform text searches across messages in the various mailboxes that contain messages. In order to improve the performance of such operations, it is useful to create and maintain a "search index" data structure. A search index enables efficient matching between tokens in a search query and the contents of messages. In order for the contents of any document, such as an email message, to be represented in a search index, the document must go through an "indexing" step, resulting in information describing the document contents being added to the index. Unfortunately, indexing large numbers of documents can be expensive both in terms of CPU utilization and search index size. For each document indexed, multiple processing steps may be required, such as conversion from a document markup format to a searchable or plain text format, language detection, tokenization, stemming and insertion into the index.

When a message thread is generated, the messages within the thread frequently re-send the same attachment multiple times, without modification. This results from use of the "reply with history" feature. As a result, when messages in a thread are indexed into the search index, an attachment may be re-indexed every time a user adds a message to a thread including the attachment. For example, if messages sent using a REPLY command are stored in an OUTBOX structure, including their attachments, those attachments may be re-indexed each time a message in the thread is received to the user's INBOX, and each time a message the thread is sent and stored in the user's SENT mailbox. Thus for purposes of document indexing, each message in a thread is treated by existing systems as a new object. Existing email clients that support attachment indexing index every attachment, regardless of whether or not is a duplicate of an attachment that occurred in a previous message.

For the reasons above and others, it would be desirable to have a new system for indexing email messages that avoids re-indexing of duplicate attachments that may be present in message threads. The system should advantageously reduce the total number of document index operations performed, while supporting a full text search index that enables searching across all messages stored in one or more user mailboxes.

SUMMARY OF THE INVENTION

To address the above described and other shortcomings of existing systems, a method and system for providing a search index for an email system that is based on message threads. In the disclosed system, email messages are associated with message threads they belong to by a thread identifier that is maintained by the email client software. The disclosed system uses this thread information to reduce the number of times a single attachment is indexed to once per thread, as opposed to as many an N per thread, where N is the number of messages in the thread.

When a new message having at least one attachment is obtained for indexing, it is indexed as N+1 separate documents, where N is the number of attached documents. An initial determination is made as to whether the message is part of a previously existing message thread. If the message is part of a message thread, then information regarding the last message in the thread is retrieved, and search index attachment meta data for the last message is extracted. A unique identifier, such as a hash code, is computed for the newly obtained attachments, and used to search for matches across the attachments for the last message in the thread. If there is a match, then the newly obtained attachment is not indexed, but the unique identifier of the previously indexed matching attachment is added to a body index document for the new message. A unique identifier associated with the new message body is also added to a list of parent identifiers associated with the attachment. If a search is subsequently issued that matches the contents of the attachment, all documents whose parent identifiers are listed in the attachment document meta data will be returned as matches. Otherwise, if an attachment is obtained for a message is not part of a previous message thread, or if a newly obtained attachment is not a match with any previously obtained attachment within the message thread to which it belongs, then the attachment is indexed into the search index, and its unique identifier is included in the index document for the newly obtained message body.

Thus there is disclosed a new system for indexing documents in an email system that avoids re-indexing of duplicate attachments present in message threads. The disclosed system advantageously reduces the total number of document index operations performed, while supporting a full text search index that enables searching across all messages stored in one or more user mailboxes.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
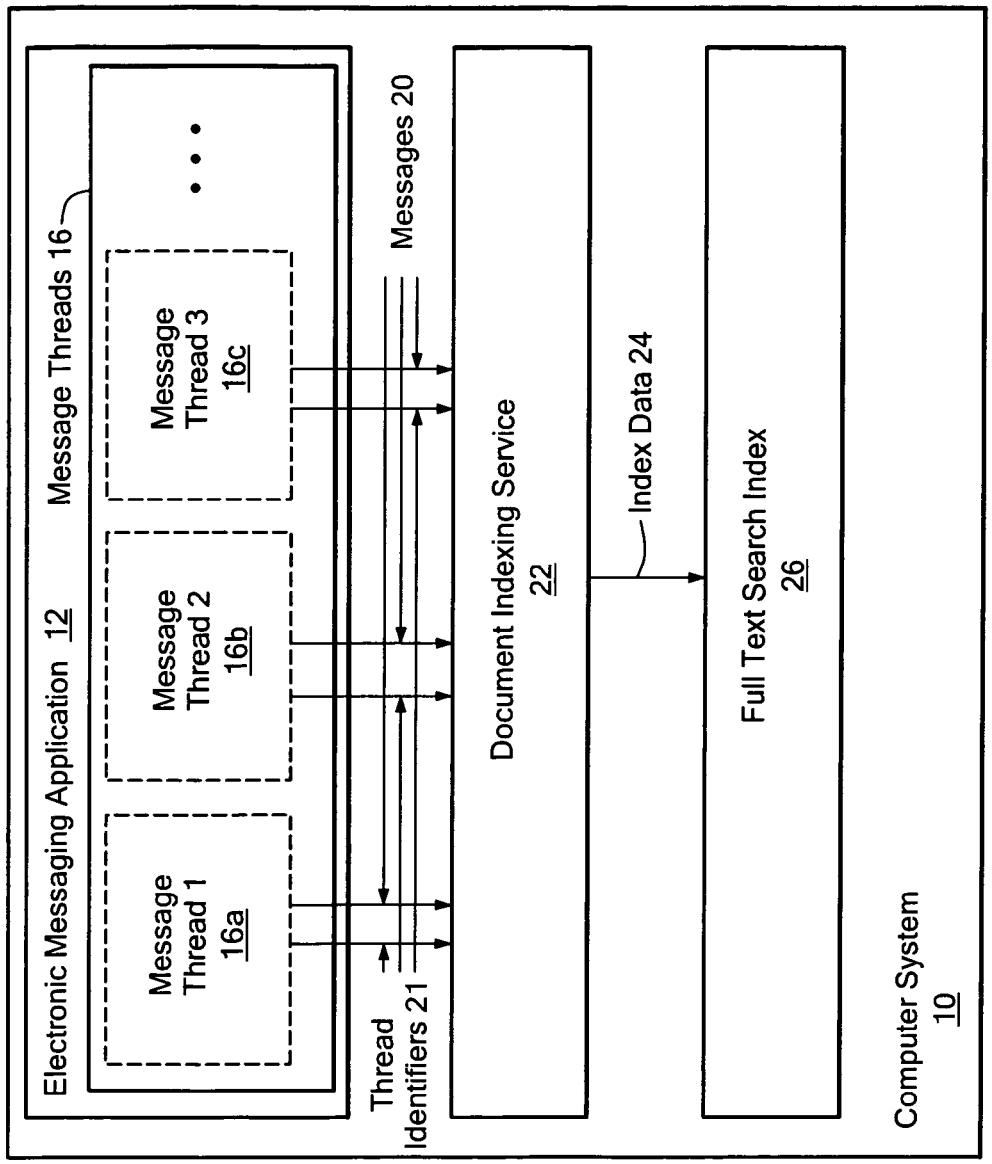
FIG. 1 is a block diagram illustrating software components in an embodiment of the disclosed system.

As shown in FIG. 1, an illustrative embodiment of the disclosed system operates using a number of software components executing on at least one computer system, shown for purposes of illustration as the computer system 10. The computer system 10 may, for example, include at least one processor, program storage, such as memory, for storing program code executable on the processor, and one or more input/output devices and/or interfaces, such as data communication and/or peripheral devices and/or interfaces. The computer system 10 may further be embodied as one or more physically distributed computer systems, such as one or more client and server computer systems, that are communicably connected by a data communication system, such as a Local Area Network (LAN), the Internet, or the like. The computer system 10 may further include appropriate operating system software.

The embodiment of FIG. 1 is shown including an electronic messaging application 12, including a number of message threads 16. The electronic messaging application 12 may, for example, consist of electronic mail application components, such as electronic mail client and/or server application software. The message threads 16 are shown for purposes of illustration as including message threads 16a, 16b and 16c, and may include any specific number of message threads. Each of the message threads 16 consists, for example, of a series of messages based on an initial or "root" message. Each of the message threads 16 includes the initial message and some number of subsequent responsive messages. The subsequent responsive messages in a thread each adds content and/or recipient information to a previously generated, transmitted, and received message in the thread. For example, each subsequent responsive message in a thread may be generated through a "reply with history" type electronic mail function, such as may be accomplished through use of a "REPLY" or "REPLY ALL" feature provided to a message recipient by the electronic messaging system through a graphical user interface. The messages in the message threads 16 may, for example, be logically stored in a number of mailbox constructs associated with a given user, and provided and maintained by an electronic mail application.

As further shown in FIG. 1, messages 20 from the message threads 16 in the electronic messaging application 12 are obtained by the document indexing service 22 for purposes of generating index data 24 to be loaded into a full text search index 26. The messages 20 may be obtained by the document indexing service 22 in various specific ways, as appropriate for a given embodiment. For example, indexing service 22 may periodically check for new messages associated with the electronic messaging application 12, such as electronic mail messages newly added to one or more mailboxes maintained by an electronic mail application program. Alternatively, or in addition, the document indexing service 22 may detect when a message is received or sent by the electronic messaging application program 12, and perform indexing on the document in response to such an event. While in the above examples the indexing service 22 pulls messages from the electronic messaging application 12 for purposes indexing them, another possible embodiment involves the electronic messaging application 12 pushing messages to the document indexing service 22 for indexing at times that are determined by the electronic messaging application program 12.

The document indexing service 22 is further operable to obtain message thread information regarding each of the messages 20 obtained for indexing. For example, as shown in FIG. 1, the document indexing service 22 may operate to obtain thread identifiers 21 associated with each of the messages 20 from the electronic messaging application 12. Alternatively, the document indexing service 22 may operate to generate thread identifiers for the messages 20 internally, for example based on analysis of the contents of the messages 20.

Figure 2:
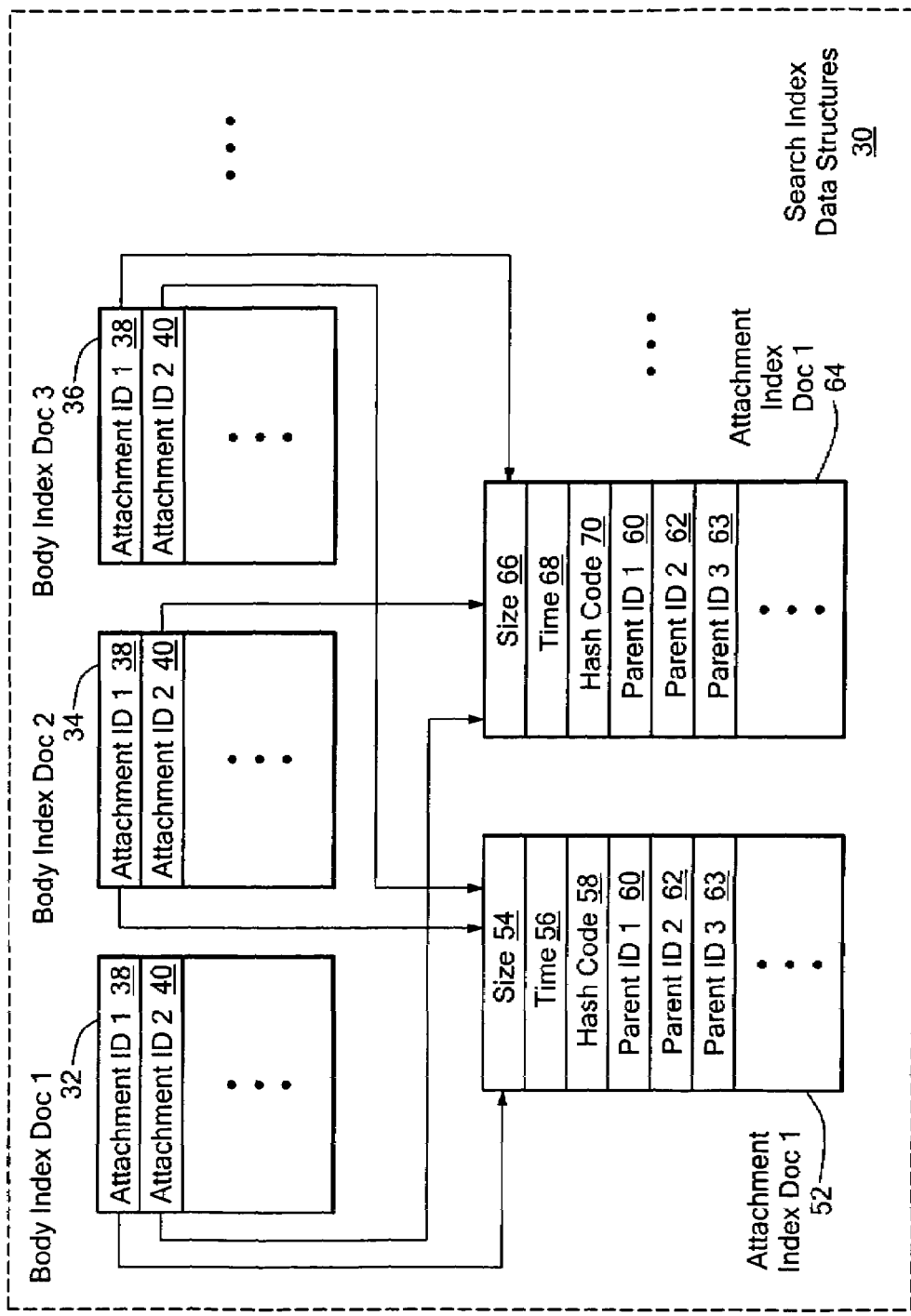
FIG. 2 is a block diagram illustrating the structure of search index software components in an embodiment of the disclosed system.
Figure 3:
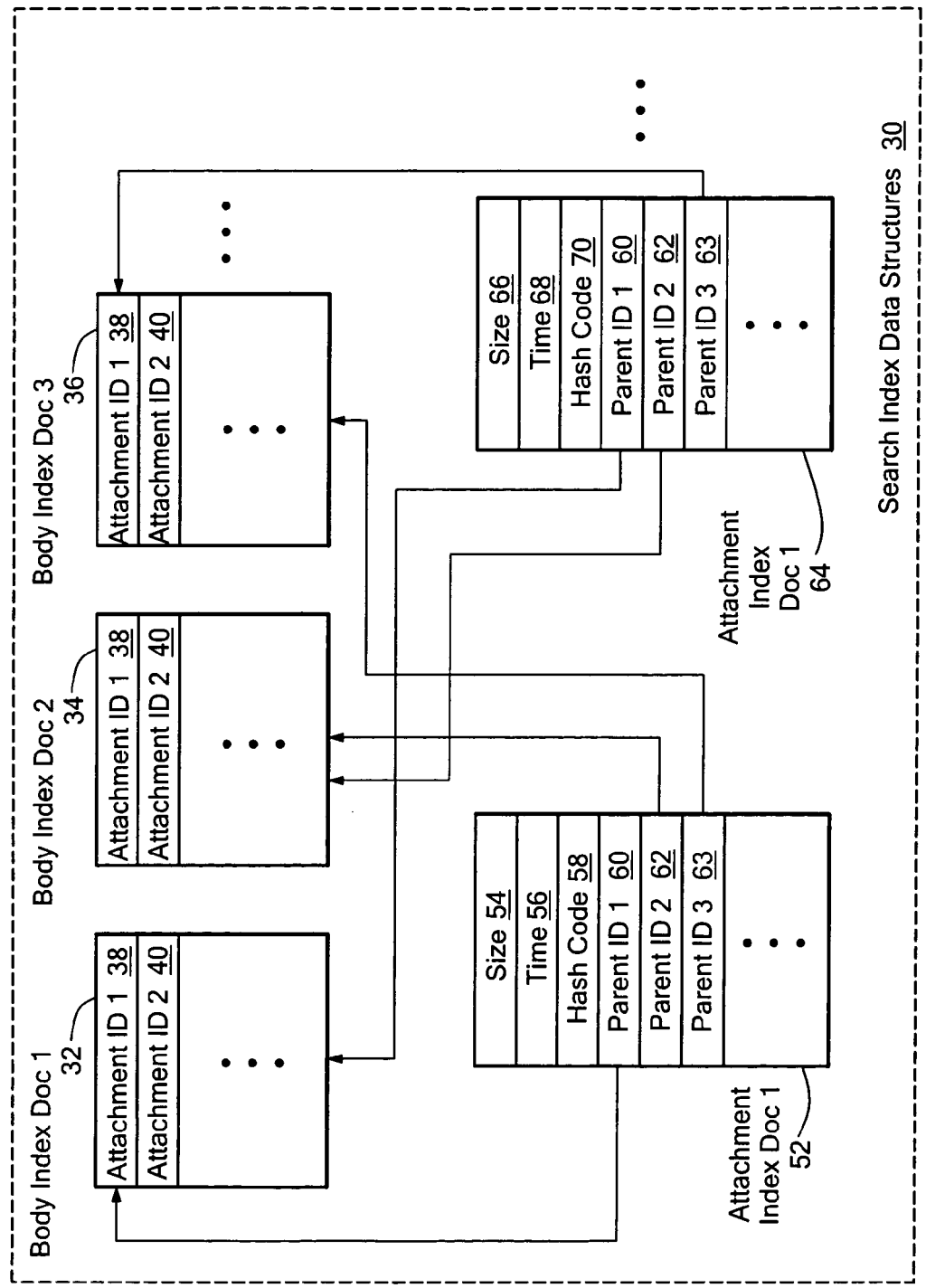
FIG. 3 is a block diagram further illustrating the structure of search index software components in an illustrative embodiment of the disclosed system.

FIGS. 2 and 3 show an example of the structure used to represent a number of electronic mail messages from the same thread in a search index of an embodiment of the disclosed system. As shown in FIG. 2, search index data structures 30 include index documents corresponding to previously indexed message components. The index document in FIG. 2 are shown including a Body Index Doc 1 32, Body Index Doc 2 34, Body Index Doc 3 36, Attachment Index Doc 1 52, and Attachment Index Doc 1 64. Body Index Doc 1 32, Body Index Doc 2 34, and Body Index Doc 3 36 represent message bodies of three messages within a common message thread. Attachment Index Doc 1 52 and Attachment Index Doc 1 64 represent two documents that were attached to each of the same three messages in the message thread.

Body Index Doc 1 32, Body Index Doc 2 34, and Body Index Doc 3 36 contain search index information regarding the message bodies of the three indexed messages, and a number of attachment identifiers that uniquely identify index documents corresponding to documents that are attached to those message bodies. As shown in FIG. 2, the attachment identifiers contained in each of Body Index Doc 1 32, Body Index Doc 2 34, and Body Index Doc 3 36 include Attachment ID 1 38 and Attachment ID 2 40, which are unique identifiers for Attachment Index Doc 1 52 and Attachment Index Doc 1 64 respectively.

As shown in FIG. 3, each of the attachment index documents includes information regarding a corresponding attachment. For example, Attachment Index Doc 1 52 is shown including a Size 54, indicating a size of the corresponding attachment document, a Time 56 indicating a time the corresponding attachment document was created, and a Hash Code 58 that is a unique identifier of the corresponding attachment document. The Hash Code 58 may be generated based on the contents or metadata associated with the corresponding attachment document. Similarly, Attachment Index Doc 2 64 includes such information regarding the attachment document corresponding to it, shown as Size 66, Time 68, and Hash Code 70.

Also contained in the attachment index documents 52 and 64 of FIG. 3 are a number of unique parent document identifiers indicating body index documents representing message bodies of messages to which copies of the corresponding attachment documents were attached within the message thread. In the example of FIG. 3, Attachment Index Doc 1 52 and Attachment Index Doc 2 64 include body index document identifiers Parent ID 1 60, Parent ID 2 62, and Parent ID 3 63, indicating Body Index Doc 1 32, Body Index Doc 2 34, and Body Index Doc 3 36 respectively. In this way, as shown for purposes of illustration in FIGS. 2 and 3, the search index data structures 30 represent the relationships between the index documents for the bodies of the three messages in the message thread, and the attached documents to each of those messages, without creating redundant attachment index documents for each copy of the attached documents in the message thread.

Figure 4:
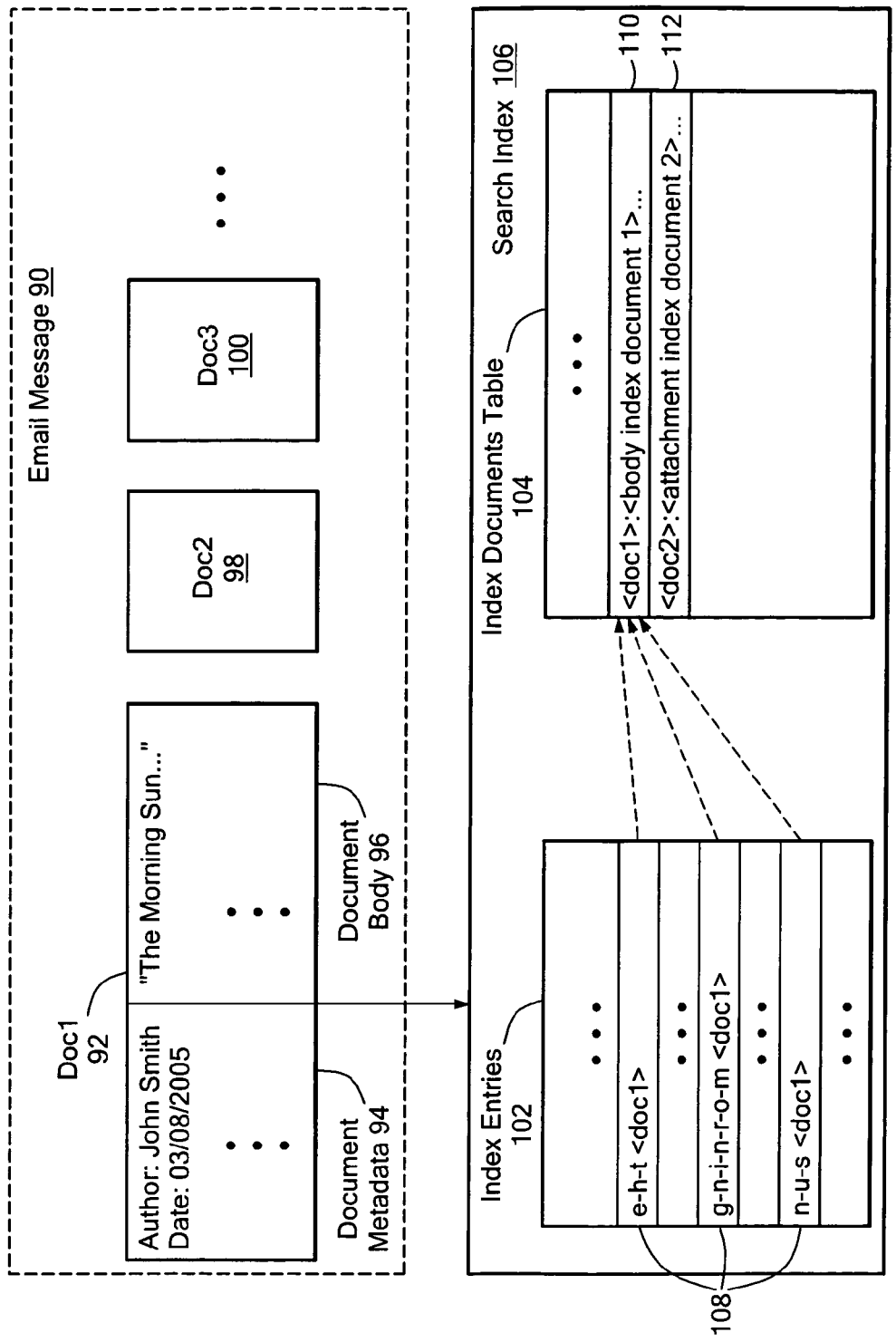
FIG. 4 is a block diagram illustrating indexing of an electronic mail message in an embodiment of the disclosed system.

FIG. 4 further illustrates the representation of an electronic mail message 90 in a search index 106 by an embodiment of the disclosed system. As shown in FIG. 4, the electronic mail message 90 includes a message body document Doc1 92, and two attachment documents Doc2 98 and Doc3 100. The message body document Doc1 92 is shown including Document Metadata 94 and Document Body 96. The Document Metadata 94 may include information such as the author of the message, the time the message was sent and/or received, and other such metadata. The Document Body 96 includes the contents of the message body, shown for example as including the text "The Morning Sun . . . ".

The Search Index 106 includes an Index Entries table 102, and an Index Documents Table 104. The Index Documents Table 104 is an illustrative example of how index documents may be organized by an embodiment of the disclosed system, but the present invention is not limited to such an embodiment. Accordingly, alternative techniques and/or structures may be used to organize the index documents as is appropriate for a given implementation, configuration or deployment of the disclosed system.

After processing by an embodiment of the disclosed indexing service, index data representing electronic mail message 90 is stored in the Search Index 106. For purposes of illustration and explanation, the Search Index 106 is shown including index entries 102. The Index Entries 102 are an example of a search index data structure that enables efficient text searching across messages stored by an electronic messaging system. The Index Entries 102 may make up or form part of what is sometimes referred to by computer scientists as a "trie", from the word "retrieval". While the disclosed system may be embodied using a trie data structure, it is not limited to such an embodiment, and any other specific type or structure may be used for the Search Index 106. The Index Entries 102 are used to store an index "profile" of the documents in the electronic mail message 90.

In the example of FIG. 4, the Index Entries 102 associate the words "the", "morning", and "sun" with an entry for the body index document corresponding to message body document Doc1 92, in the Index Documents Table 44. As in one conventional practice, matching of text strings in the Index Entries 102 is done in reverse character order; "the" is therefore matched by the entry containing "e-h-t", "morning" by "g-n-i-n-r-o-m", etc. The entries 108 in Index Entries 102 represent the contents of the message body document Doc1 92, and may further include indications, pointers or links describing where Doc1 92 is stored, so that such information can be provided in search results for search queries matching the contents of Doc1 92. Other information, reflecting frequency of occurrence or location within the document Doc 1 92, may further be included within the search index 106.

In the example of FIG. 4, the entries 108 in the Index Entries 102 are associated with the document Doc1 92 by the identifier "<doc1>", which also identifies the relevant entry 110 in the Index Documents Table 104. Another entry 112 contains or indicates the attachment index document for attachment document Doc2 98, and is associated with the contents of that message attachment document through an identifier "<doc2>". Any specific technique or structure may be used to associate message document contents with index documents within the search index 106.

Advantageously, after an attachment document has been indexed by the disclosed system, it need not be re-indexed if it occurs again within a common message thread. Accordingly, the Index Entries 102 need not be modified when a copy or duplicate of an attachment document that was previously encountered and indexed within a common message thread. In order to determine whether an attachment document passed to the indexing service has previously been "profiled", such that information representing the document has already been stored in the Index Entries 102, information stored in the Index Documents Table 104 may be checked. For example, if there is no attachment index document in the Index Documents Table 104 representing a copy or duplicate of an attachment document within a common message thread as that of an attachment document obtained by the indexing service for indexing, that may provide indication that the document has not previously been indexed. Hash codes or the like, generated based on portions of the content of or metadata associated with previously indexed documents, may be stored in the index documents of the Index Documents table 104. These codes for previously indexed documents may then be compared with those generated based on newly obtained documents to determine whether the newly obtained documents have previously been indexed. Similarly, thread identifiers may further be stored in the index documents of the Index Documents table 104 to facilitate comparison of newly obtained message documents with previously indexed documents within a common message thread.

Figure 5:
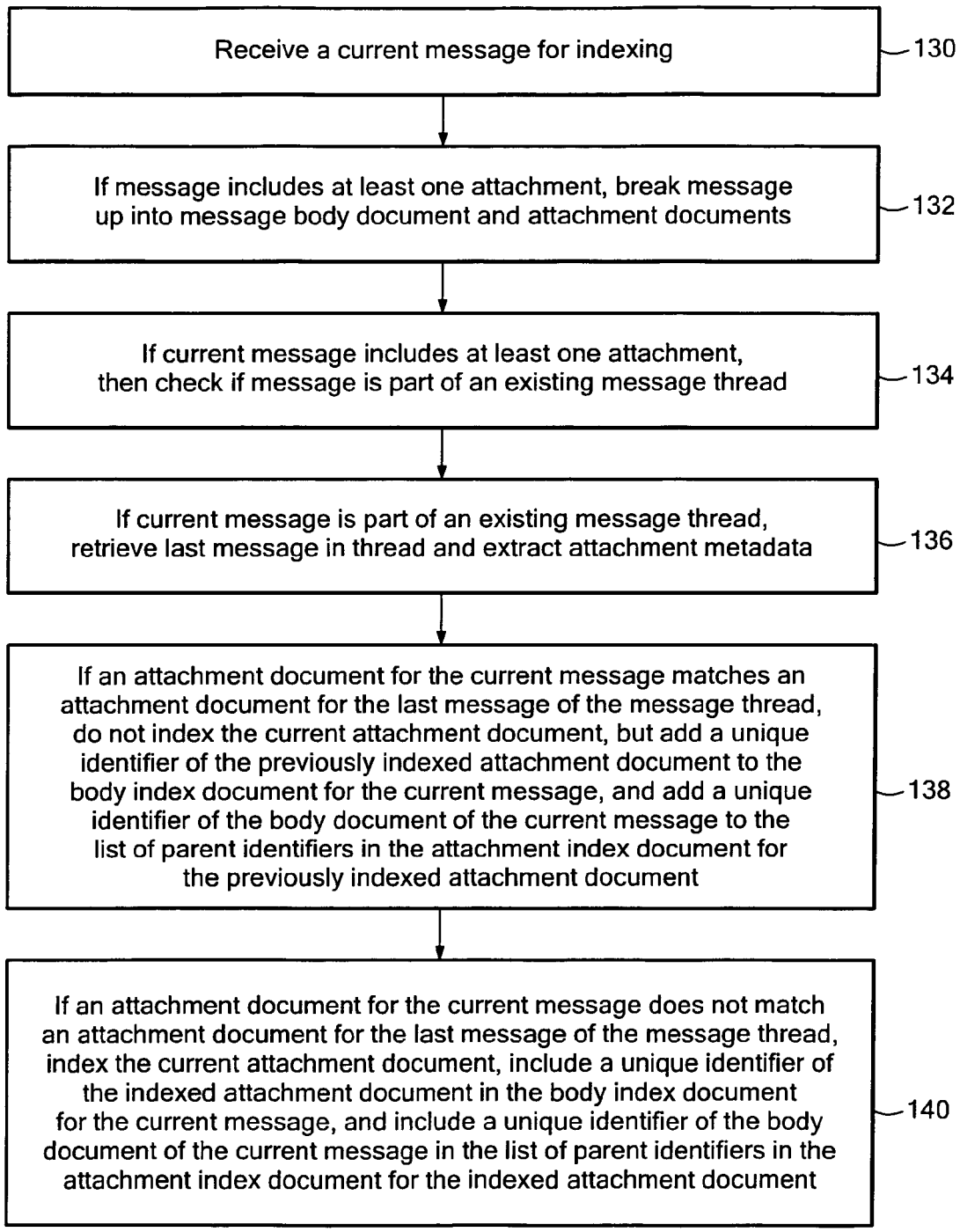
FIG. 5 is a flow chart illustrating steps performed by an embodiment of the disclosed system.

FIG. 5 is a flow chart showing steps performed in an embodiment of the disclosed system. At step 130, the disclosed system receives a current message for indexing. The disclosed system then determines whether the current message includes at least one attachment, and if so, at step 132 breaks the message up into a message body document and individual attachment documents for purposes of indexing.

If the current message includes at least one attachment, at step 134 the disclosed system determines whether the current message is part of an existing message thread. At step 136, if the current message is part of an existing message thread, the disclosed system retrieves a last message in the existing message thread, and extracts attachment metadata at step 136. The attachment metadata extracted at step 136 may include a code, such as a hash code, generated based on each of the documents attached to the last message in the existing message thread. Such codes may then be used at step 138 to compare similarly generated codes based on each attachment to the current message to determine if any such attachment documents to the current message match any attachments to the last message in the existing message thread.

At step 138, the disclosed system determines whether an attachment document for the current message matches an attachment document for the last message of the existing message thread to which the current message belongs. If so, then that attachment document is not re-indexed. Instead, the disclosed system adds a unique identifier of the previously indexed attachment document to the body index document for the current message, and adds a unique identifier of the body document of the current message to a list of parent identifiers in the attachment index document for the previously indexed attachment document.

At step 140, in the case that the attachment document for the current message does not match an attachment document for the last message of the common message thread, the disclosed system indexes the attachment document, such that the contents of the attachment document are added to the search index and associated with an attachment index document corresponding to the attachment. A unique identifier of the indexed attachment document is included in the body index document for the current message, and a unique identifier for the body document of the current message is included in a list of parent identifiers in the attachment index document for the indexed attachment document.

FIGS. 1-5 are block diagram and flowchart illustrations of methods, apparatus(s) and computer program products according to an embodiment of the invention. It will be understood that each block of FIGS. 1-5, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A computer-implemented method for providing a search index for an electronic messaging system, comprising:
   obtaining a current message for indexing;
   determining whether said current message includes an attachment;
   in the event said current message includes an attachment, determining whether said message is part of an existing message thread;
   in the event said current message is part of an existing message thread, comparing at least one attachment to a last previously received message in said existing message thread; and
   in the event that said attachment to said current message matches said attachment to said last previously received message in said existing message thread, storing a unique identifier associated with said attachment to said last previously received message in said existing message thread in a body index document representing said body of said current message in said search index.

2. The method of claim 1, further comprising:
   in the event that said attachment to said current message matches said attachment to said last previously received message in said existing message thread, adding a unique identifier of said body index document to a list of parent document identifiers associated with search index data for said attachment to said last previously received message in said existing message thread.

3. The method of claim 2, further comprising:
   in the event said attachment to said current message does not match an attachment to said last previously received message in said existing message thread, generating an attachment index document representing said attachment to said current message in said search index.

4. The method of claim 3, further comprising:
   in the event said attachment to said current message does not match any attachment to said last previously received message in said existing message thread, writing a unique identifier of said attachment to the current message into a body index document representing said body of said current message in said search index.

5. The method of claim 4, further comprising:
in the event said attachment to said current message does not match any attachment to said last previously received message in said existing message thread, writing a unique identifier of said body of said current message into an attachment index document representing said attachment to said current message in said search index.

6. The method of claim 1 wherein said electronic messaging system is an electronic mail system.

7. A system having a computer readable memory, said computer readable memory having a computer program for providing a search index for an electronic messaging system stored thereon, said computer program comprising:
program code for obtaining a current message for indexing;
program code for determining whether said current message includes an attachment;
program code for, in the event said current message includes an attachment, determining whether said message is part of an existing message thread;
program code for, in the event said current message is part of an existing message thread, comparing at least one attachment to a last previously received message in said existing message thread; and
program code for, in the event that said attachment to said current message matches said attachment to said last previously received message in said existing message thread, storing a unique identifier associated with said attachment to said last previously received message in said existing message thread in a body index document representing said body of said current message in said search index.

8. The system of claim 7, further comprising:
program code for, in the event that said attachment to said current message matches said attachment to said last previously received message in said existing message thread, adding a unique identifier of said body index document to a list of parent document identifiers associated with search index data for said attachment to said last previously received message in said existing message thread.

9. The system of claim 8, further comprising:
program code for, in the event said attachment to said current message does not match an attachment to said last previously received message in said existing message thread, generating an attachment index document representing said attachment to said current message in said search index.

10. The system of claim 9, further comprising:
program code for, in the event said attachment to said current message does not match any attachment to said last previously received message in said existing message thread, writing a unique identifier of said attachment to the current message into a body index document representing said body of said current message in said search index.

11. The system of claim 10, further comprising:
program code for, in the event said attachment to said current message does not match any attachment to said last previously received message in said existing message thread, writing a unique identifier of said body of said current message into an attachment index document representing said attachment to said current message in said search index.

12. The system of claim 7 wherein said electronic messaging system is an electronic mail system.

13. A computer program product having a computer readable storage medium, said computer readable storage medium having a computer program for providing a search index for an electronic messaging system stored thereon, said computer program comprising:
program code for obtaining a current message for indexing;
program code for determining whether said current message includes an attachment;
program code for, in the event said current message includes an attachment, determining whether said message is part of an existing message thread;
program code for, in the event said current message is part of an existing message thread, comparing at least one attachment to a last previously received message in said existing message thread; and
program code for, in the event that said attachment to said current message matches said attachment to said last previously received message in said existing message thread, storing a unique identifier associated with said attachment to said last previously received message in said existing message thread in a body index document representing said body of said current message in said search index.

* * * * *